Aug. 5, 1952         A. J. DOYLE         2,605,940
BULK MATERIALS FREIGHT CONTAINER
Filed July 13, 1946
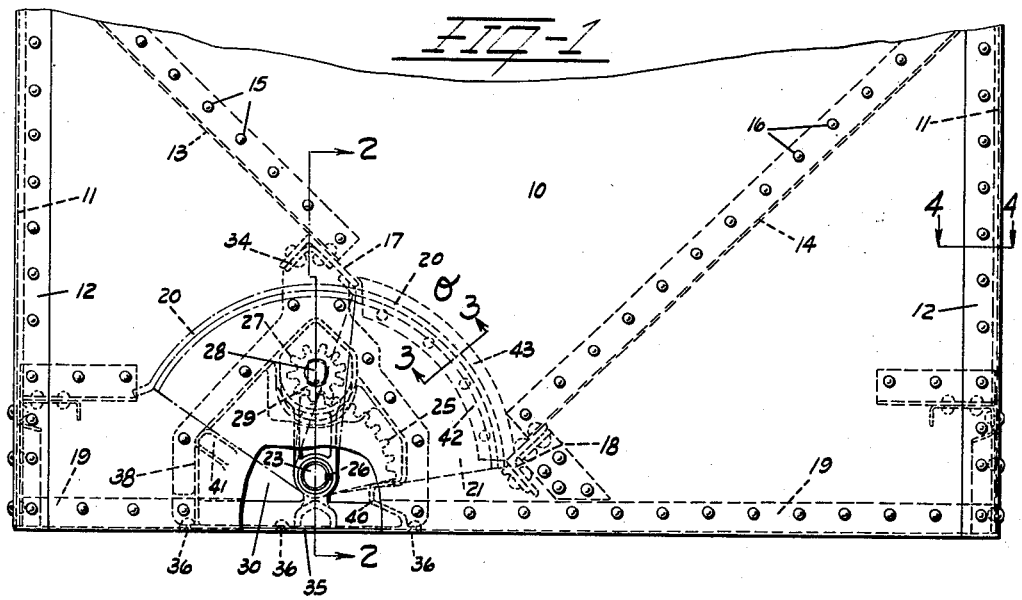
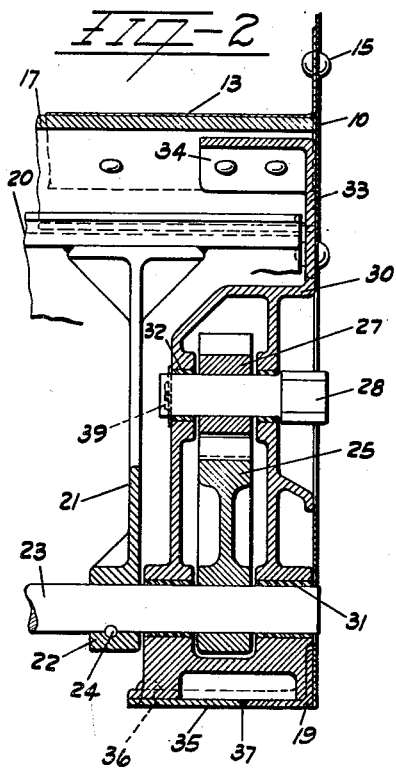
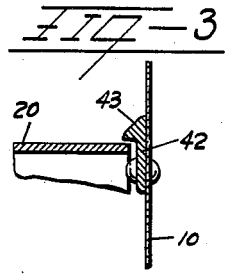
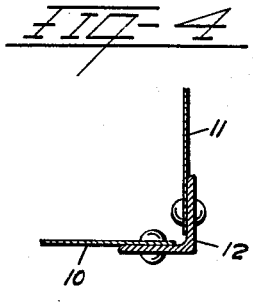
~INVENTOR~
ARTHUR J. DOYLE
BY~ Samuel Reese
~ATT'Y.~

Patented Aug. 5, 1952

2,605,940

UNITED STATES PATENT OFFICE 2,605,940

BULK MATERIALS FREIGHT CONTAINER

Arthur J. Doyle, Cleveland, Ohio, assignor to The Youngstown Steel Door Company, Cleveland, Ohio, a corporation of Ohio Application July 13, 1946, Serial No. 683,575

4 Claims. (Cl. 222—505)

This invention relates to bulk materials freight containers and is directed more particularly to the discharge mechanism for such containers.

It is an object of this invention to provide discharge mechanism for bulk material freight containers which shall embody gears fully housed to prevent breakage and interference with operation.

A further object of this invention is to provide discharge mechanism for bulk materials freight containers which shall embody gears fully housed and yet readily accessible for replacement when necessary.

A further object of this invention is to provide discharge mechanism for bulk materials freight containers which shall embody gear housings carrying supports for slope sheet angles of the containers.

Other objects of the invention will become clear as the description thereof proceeds.

In the drawings forming part of this specification:

Fig. 1 is a partial side elevation of a bulk materials freight container embodying the instant invention, a portion being broken away to more clearly show the invention.

Fig. 2 is a vertical section taken on line 2—2 of Fig. 1.

Fig. 3 is a vertical section taken on line 3—3 of Fig. 1.

Fig. 4 is a horizontal section taken on line 4—4 of Fig. 1.

Referring to the drawings, there is illustrated the lower portion of a bulk materials freight container the construction of which is generally that of bulk materials freight containers now on the market. These containers are rectangular in horizontal section and embody side walls such as 10 and end walls such as 11 secured together and reinforced at the corners by means of structural angle members such as 12. Slope sheets 13 and 14 extend between and are secured as by means of rivets 15 and 16 to the side walls 10 of the container. At their lower ends the slope sheets are fastened to and supported by angle members 17 and 18 which, as more clearly shown in Fig. 1 of the drawings, are spaced apart in order to provide a discharge opening O at the bottom of the container. The lower margins of the side and end sheets are secured to and reinforced by angle members such as 19 which, moreover, provide a base upon which the container may be supported.

The discharge opening O in the container is controlled by means of a rotary valve formed in the illustrated and preferred embodiment of the invention by means of a curved plate 20 welded to a plurality of spaced spiders, one of which is illustrated at 21. Two of such spiders are believed to be ample but, if desired, three or more may be used. Each of the spiders is formed with a hub 22 through which a shaft 23 extends. Movement of the spiders along the shaft is prevented by pin 24.

To actuate the valve 20 to open and close the discharge opening a segmental gear 25 is fastened upon the shaft 23 for rotation therewith by means of a key 26 which also preferably serves to obtain rotation of the adjacent spider with the shaft. A separate key may, however, be used for the latter purpose. Rotation of the segmental gear and shaft 23 is secured by a pinion 27 secured upon a shaft 28 by key 29. The end of shaft 28 is readily accessible from the outside of the container as is more clearly shown in Fig. 2 of the drawings.

In order to prevent damage to the gear and to the pinion and to prevent lodgment of the material between the teeth of these members, they are protected by being completely housed within a housing member 30. This member which is preferably in the form of a casting is provided with a bearing 31 in which one end of the shaft 23 is journalled and a bearing 32 within which the pinion shaft 28 is journalled. While only one end of the valve mechanism has been disclosed, it will be readily understood that the construction at the other end of the mechanism will be similar to that shown where it is desired to provide a mechanism operable from either side of the container. However, if it is preferred to provide a valve mechanism operable from one side of the container, it is only necessary to provide any desired bearing for the other end of the shaft 23.

With reference to Fig. 2 of the drawings, it will be seen that the housing member 30 is extended upwardly as shown at 33 and formed with an integral angular, inwardly extending portion 34. This portion, as is shown more clearly in Fig. 1 of the drawings, provides a support for one end of the slope sheet angle 17, which, as is known to those skilled in the art, extends from side to side of the container. A similar angular extension is likewise provided on the bearing member employed for the other end of shaft 23.

In accordance with the invention, the bottom of the housing member 30 is open when formed and is adapted to be closed by a plate member 35 when the housing member has been assembled with the container. As shown, plate member 35 is preferably secured to housing member 30 by means of rivets 36 and, if desired, may be tack welded to the adjacent edge of angle member 19 as shown at 37. The open bottom of the housing member and the distance provided between bearing 31 and the left-hand side wall 38 of the housing member permits the removal and replacement of both the segmental gear and the pinion, if necessary. This is accomplished by removing the plate member 35 and rotating the segmental gear by means of the pinion until the valve is in open position. A pin 24 and keys 26 are removed and the shaft backed out of bearing 31 until it is disengaged from the segmental gear. The gear may then be readily removed from the open bottom of the housing member. To replace the pinion member 27, key 29 and cotter pin 39 are removed, shaft 28 is withdrawn and the pinion removed through the open bottom of the housing member. The manner of replacement of the gear and the pin will be apparent without detailed explanation.

In Fig. 1 of the drawings, the rotary valve is shown in closed position in dotted lines. The valve is arrested in this position by engagement between the segmental gear and a stop 40 cast integrally with the housing member. The rotary valve is shown in its open position in dot and dash lines in Fig. 1 of the drawings, opening movement of the valve being limited by an integrally formed inwardly extending stop 41 formed on the inner wall of the housing member.

To prevent escape of the material in the container when the valve is closed a member 42 is secured to each side wall of the container. These members are formed with sloping shoulders 43 which overlie the adjacent ends of the valve and thereby prevent escape of the material in the container.

It will be apparent that numerous changes and modifications in the details of the invention will be clear to those skilled in the art. It is intended, therefore, that all such modifications and changes be comprehended within this invention, which is to be limited only by the scope of the claims appended hereto.

I claim:

1. A transportation freight container for bulk materials having opposed side walls and a bottom discharge opening extending between said side walls, a housing member secured upon the inside of one of said walls, a shaft extending between said side walls, said shaft being journalled in said housing member, a closure valve for said discharge opening mounted upon said shaft for rotation therewith, a segmental gear completely enclosed by said housing member, said segmental gear being mounted upon said shaft for rotation therewith within said housing member, a second shaft journalled in said housing member, and a pinion completely enclosed by said housing member and mounted upon said second shaft for rotation thereby, said segmental gear meshing with said pinion, and a stop on said container engageable with said valve when the latter is open to stop said valve and segmental gear above the bottom of said container.

2. A transportation freight container for bulk materials having opposed side walls and a bottom discharge opening extending between said side walls, a housing member secured upon the inside of one of said walls, a shaft extending between said side walls, said shaft being journalled in said housing member, a closure valve for said discharge opening mounted upon said shaft for rotation therewith, a segmental gear completely enclosed by said housing member, said segmental gear being mounted upon said shaft for rotation therewith within said housing member, a second shaft journalled in said housing member, and a pinion completely enclosed by said housing member and mounted upon said second shaft for rotation thereby, said segmental gear meshing with said pinion, said valve and said segmental gear lying above the bottom of said container when said valve is open, a stop integral with and on the outside of said housing member engageable by said valve for limiting opening movement thereof, and a stop integral with and on the inside of said housing member engageable by said segmental gear for limiting closing movement of said valve.

3. A transportation freight container for bulk materials having opposed side walls, slope sheets extending between said side walls and being spaced apart to form a bottom discharge opening, angle members extending between said side walls to which the lower ends of the slope sheets are fastened, a housing member secured upon the inside of one of said walls, a shaft extending between said side walls, said shaft being journalled in said housing member, a closure valve for said discharge opening mounted upon said shaft for rotation therewith, a segmental gear completely enclosed by said housing member, said segmental gear being mounted upon said shaft for rotation therewith within said housing member, a second shaft journalled in said housing member, and a pinion completely enclosed by said housing member and mounted upon said second shaft for rotation thereby, said segmental gear meshing with said pinion, said valve and said segmental gear lying above the bottom of said container when said valve is open, said housing member having an integral angular portion extending inwardly therefrom, one of said angle members being supported upon and secured to said integral portion.

4. A transportation freight container for bulk materials having opposed side walls and a bottom discharge opening extending between said side walls, a housing member secured upon the inside of one of said walls, a shaft extending between said side walls, said shaft being journalled in said housing member, a closure valve for said discharge opening mounted upon said shaft for rotation therewith, a segmental gear completely enclosed by said housing member, said segmental gear being mounted upon said shaft for rotation therewith within said housing member, a second shaft journalled in said housing member and a pinion completely enclosed by said housing member and mounted upon said second shaft for rotation thereby, said segmental gear meshing with said pinion, said valve and said segmental gear lying above the bottom of said container when said valve is open, said housing member having an open bottom to permit installation and replacement of said gear and pinion while said housing member is secured to said wall, and a removable plate member secured to said housing member for closing said open bottom.

ARTHUR J. DOYLE.

REFERENCES CITED

The following references are of record in the file of this patent:

UNITED STATES PATENTS

| Number | Name | Date |
|---|---|---|
| 1,667,959 | Talbot et al. | May 1, 1928 |
| 2,127,810 | Ditchfield | Aug. 23, 1938 |
| 2,153,865 | Gerach | Apr. 11, 1939 |
| 2,260,433 | Cadwell | Oct. 28, 1941 |
| 2,293,200 | Foote | Aug. 18, 1942 |
| 2,318,763 | Ditchfield | May 11, 1943 |